(12) United States Patent
Stuart et al.

(10) Patent No.: US 10,539,020 B2
(45) Date of Patent: Jan. 21, 2020

(54) TWO SPOOL GAS TURBINE ENGINE WITH INTERDIGITATED TURBINE SECTION

(71) Applicant: General Electric Company, Schenectady, NY (US)

(72) Inventors: Alan Roy Stuart, Cincinnati, OH (US); Jeffrey Donald Clements, Mason, OH (US); Richard Schmidt, Loveland, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 431 days.

(21) Appl. No.: 15/412,157

(22) Filed: Jan. 23, 2017

(65) Prior Publication Data
US 2018/0274365 A1   Sep. 27, 2018

(51) Int. Cl.
*F01D 1/24* (2006.01)
*F01D 1/26* (2006.01)
(Continued)

(52) U.S. Cl.
CPC .......... *F01D 1/26* (2013.01); *F01D 1/24* (2013.01); *F01D 5/03* (2013.01); *F01D 5/06* (2013.01);
(Continued)

(58) Field of Classification Search
CPC ..... F01D 1/24; F01D 1/26; F01D 5/03; F02C 3/067; F02K 3/072
See application file for complete search history.

(56) References Cited

U.S. PATENT DOCUMENTS 2,360,130 A * 10/1944 Heppner .............. F02C 3/067
                                                              60/268
2,548,975 A *  4/1951 Hawthorne .......... F02C 3/073
                                                              415/79
(Continued)

FOREIGN PATENT DOCUMENTS

GB        544909 A  *  5/1942  ............ F01D 5/288
GB        572859 A  * 10/1945  ............ F01D 5/03
GB        586569 A  *  3/1947  ............ F01D 1/26

OTHER PUBLICATIONS

International Search Report and Written Opinion issued in connection with corresponding PCT Application No. PCT/US2017/064796 dated Feb. 26, 2018.
(Continued)

*Primary Examiner* — Gerald L Sung
*Assistant Examiner* — Marc J Amar
(74) *Attorney, Agent, or Firm* — Dority & Manning, P.A.

(57) ABSTRACT

The present disclosure is directed to a gas turbine engine defining a longitudinal direction, a radial direction, and a circumferential direction, and wherein the gas turbine engine defines an upstream end and a downstream end along the longitudinal direction. The gas turbine engine includes a turbine section that includes a first rotating component and a second rotating component. The first rotating component includes an inner shroud and an outer shroud outward of the inner shroud in the radial direction. The outer shroud defines a plurality of outer shroud airfoils extended inward of the outer shroud along the radial direction. The first rotating component further includes at least one connecting airfoil coupling the inner shroud and the outer shroud. The second rotating component is upstream of the one or more connecting airfoils of the first rotating component along the longitudinal direction. The second rotating component includes a plurality of second airfoils extended outward in the radial
(Continued)

direction. The first rotating component defines at least one stage of the plurality of outer shroud airfoils upstream of the second rotating component.

20 Claims, 5 Drawing Sheets

(51) Int. Cl.
  *F02K 3/072*  (2006.01)
  *F02C 3/067*  (2006.01)
  *F01D 5/03*   (2006.01)
  *F01D 5/06*   (2006.01)
  *F02K 3/06*   (2006.01)

(52) U.S. Cl.
  CPC ........... *F02C 3/067* (2013.01); *F02K 3/06* (2013.01); *F02K 3/072* (2013.01); *F05D 2220/32* (2013.01); *F05D 2240/24* (2013.01); *F05D 2240/50* (2013.01); *F05D 2250/38* (2013.01)

(56) References Cited

U.S. PATENT DOCUMENTS

| | | | | |
|---|---|---|---|---|
| 2,644,298 | A * | 7/1953 | McLeod | F02K 3/06 60/226.1 |
| 2,712,727 | A * | 7/1955 | Morley | F02C 7/047 60/39.093 |
| 3,034,298 | A | 5/1962 | White | |
| 3,903,690 | A | 9/1975 | Jones | |
| 4,159,624 | A * | 7/1979 | Gruner | F02C 3/107 60/268 |
| 4,664,599 | A | 5/1987 | Robbins et al. | |
| 4,704,862 | A | 11/1987 | Dennison et al. | |
| 4,790,133 | A | 12/1988 | Stuart | |
| 4,860,537 | A | 8/1989 | Taylor | |
| 5,307,622 | A * | 5/1994 | Ciokajlo | F02C 3/067 415/65 |
| 5,361,580 | A * | 11/1994 | Ciokajlo | F01D 25/162 60/226.1 |
| 5,363,641 | A * | 11/1994 | Dixon | F02C 6/08 60/226.1 |
| 5,443,590 | A * | 8/1995 | Ciokajlo | F01D 5/02 415/192 |
| 6,164,656 | A | 12/2000 | Frost | |
| 6,546,713 | B1 | 4/2003 | Hidaka et al. | |
| 6,666,017 | B2 | 12/2003 | Prentice et al. | |
| 6,763,652 | B2 * | 7/2004 | Baughman | F02C 3/067 415/199.5 |
| 6,763,654 | B2 * | 7/2004 | Orlando | F01D 1/24 415/69 |
| 7,185,484 | B2 * | 3/2007 | Griffin, III | F01D 1/24 415/68 |
| 7,269,938 | B2 * | 9/2007 | Moniz | F01D 25/16 415/68 |
| 7,290,386 | B2 * | 11/2007 | Orlando | F01D 1/26 415/65 |
| 7,334,392 | B2 * | 2/2008 | Moniz | F01D 1/24 60/204 |
| 7,334,981 | B2 * | 2/2008 | Moniz | F01D 25/16 29/889.2 |
| 7,451,592 | B2 * | 11/2008 | Taylor | F01D 1/26 60/268 |
| 7,510,371 | B2 * | 3/2009 | Orlando | F01D 5/141 415/191 |
| 7,513,102 | B2 * | 4/2009 | Moniz | F01D 5/14 60/226.1 |
| 8,365,510 | B2 | 2/2013 | Lugg | |
| 8,667,775 | B1 | 3/2014 | Kisska et al. | |
| 9,103,227 | B2 | 8/2015 | Kupratis et al. | |
| 9,494,077 | B2 | 11/2016 | Chanez et al. | |
| 9,670,839 | B2 * | 6/2017 | Lee | F01D 1/26 |
| 2004/0055276 | A1 * | 3/2004 | John Lewis | F02C 3/067 60/226.1 |
| 2004/0060279 | A1 * | 4/2004 | Robert Joseph | F01D 1/24 60/226.1 |
| 2005/0241292 | A1 * | 11/2005 | Taylor | F01D 1/26 60/226.1 |
| 2006/0032210 | A1 * | 2/2006 | Giffin, III | F01D 1/26 60/226.1 |
| 2006/0090451 | A1 * | 5/2006 | Moniz | F01D 1/24 60/226.1 |
| 2006/0093464 | A1 * | 5/2006 | Moniz | F01D 25/16 415/68 |
| 2006/0093467 | A1 * | 5/2006 | Orlando | F01D 1/26 415/68 |
| 2006/0093469 | A1 * | 5/2006 | Moniz | F01D 25/16 415/68 |
| 2006/0272314 | A1 * | 12/2006 | Moniz | F01D 5/14 60/226.1 |
| 2006/0275111 | A1 * | 12/2006 | Orlando | F01D 5/141 415/191 |
| 2008/0184694 | A1 * | 8/2008 | Guimbard | F01D 1/26 60/224 |
| 2010/0089019 | A1 | 4/2010 | Knight et al. | |
| 2014/0290209 | A1 * | 10/2014 | Lee | F01D 1/26 60/39.162 |
| 2015/0226075 | A1 | 8/2015 | Aoki et al. | |
| 2016/0069260 | A1 | 3/2016 | Speak et al. | |
| 2016/0102607 | A1 | 4/2016 | Hiernaux | |

OTHER PUBLICATIONS

Stuart, A.R., Three Spool Gas Turbine engine with interdigitated turbine section, GE Co-Pending U.S. Appl. No. 15/412,175, filed Jan. 23, 2017.

Stuart, A.R., Interdigitated counter rotating turbine system and method of operation, GE Co-Pending U.S. Appl. No. 15/412,197, filed Jan. 23, 2017.

Stuart, A.R., Interdigitated turbine engine air bearing and method of operation, GE Co-Pending U.S. Appl. No. 15/605,164, filed May 25, 2017.

Stuart, A.R., Interdigitated turbine engine air bearing cooling structure and method of thermal management, GE Co-Pending U.S. Appl. No. 15/605,225, filed May 25, 2017.

Stuart, A.R., Method and structure of interdigitated turbine engine thermal management, GE Co-Pending U.S. Appl. No. 15/605,281, filed May 25, 2017.

Stuart, A.R., Air bearing and thermal management nozzle arrangement for interdigitated turbine engine, GE Co-Pending U.S. Appl. No. 15/605,351, filed May 25, 2017.

* cited by examiner

TWO SPOOL GAS TURBINE ENGINE WITH INTERDIGITATED TURBINE SECTION

FIELD

The present subject matter relates generally to gas turbine engine architecture. More particularly, the present subject matter relates to a turbine section for gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional gas turbine engines generally include turbine sections defining a high pressure turbine in serial flow arrangement with an intermediate pressure turbine and/or low pressure turbine. The high pressure turbine includes an inlet or nozzle guide vane between the combustion section and the high pressure turbine rotor. Conventionally, combustion gases exiting the combustion section define a relatively low velocity compared to a velocity (e.g., along a circumferential or tangential direction) of the first rotating stage of the turbine, generally defined as the high pressure turbine rotor. Thus, conventionally, the nozzle guide vane serves to accelerate a flow of combustion gases exiting the combustion section to more closely match or exceed the high pressure turbine rotor speed along a tangential or circumferential direction. Such acceleration of flow using a nozzle guide vane to match or exceed high pressure turbine rotor speed is known to improve general engine operability and performance.

Furthermore, conventional gas turbine engine turbine sections generally include successive rows or stages of stationary and rotating airfoils, or vanes and blades, respectively. This conventional configuration generally conditions a flow of the combustion gases entering and exiting each stage of vanes and blades. However, conventional turbine sections, and especially stationary airfoils (i.e. vanes and nozzle guide vanes) require considerable quantities and masses of cooling air to mitigate damage due to hot combustion gases. For example, generally, nozzle guide vanes are designed to withstand a maximum combustion gas temperature along an annulus (i.e. hot spots), which may be significantly larger than an average combustion gas temperature along the annulus. Thus, conventional engines are designed to use significant quantities or masses of cooling air from a compressor section or unburned air from the combustion section to mitigate structural damage, wear, deterioration, and ultimately, maintenance and repair, of the nozzle guide vanes. However, this cooling air adversely affects overall engine efficiency, performance, fuel consumption, and/or operability by removing energy that could otherwise be used in combustion to drive the turbines, compressors, and fan. Still further, the nozzle guide vane is often a limiting component when determining maintenance and repair intervals for gas turbine engines, thereby limiting overall engine performance and efficiency.

A known solution to improve turbine section efficiency is to interdigitate the rotors of the turbine section (i.e. successive rows or stages of rotating airfoils or blades). For example, a known solution is to configure a turbine section, in serial flow arrangement from an upstream end to a downstream end along a longitudinal direction, with a nozzle guide vane, a high pressure turbine rotor, another turbine vane stage (i.e. stationary airfoils), and an intermediate pressure turbine interdigitated with a low pressure turbine. Another known solution is to configure a turbine section, in serial flow arrangement, with a nozzle guide vane, a high pressure turbine rotor, and various levels of interdigitated rotors thereafter, including low, intermediate, or high pressure turbine rotors.

However, despite various known solutions, there exists a need for an engine including a turbine section that may enable additional stages of interdigitation. Still further, despite various known solutions, there exists a need for a turbine section that may further reduce cooling air consumption, increase engine efficiency, performance, and/or operability, and/or reduce part quantities, weight, and/or packaging (i.e. axial and/or radial dimensions).

BRIEF DESCRIPTION

Aspects and advantages of the invention will be set forth in part in the following description, or may be obvious from the description, or may be learned through practice of the invention.

The present disclosure is directed to a gas turbine engine defining a longitudinal direction, a radial direction, and a circumferential direction, and wherein the gas turbine engine defines an upstream end and a downstream end along the longitudinal direction. The gas turbine engine includes a turbine section that includes a first rotating component and a second rotating component. The first rotating component includes an inner shroud and an outer shroud outward of the inner shroud in the radial direction. The outer shroud defines a plurality of outer shroud airfoils extended inward of the outer shroud along the radial direction. The first rotating component further includes at least one connecting airfoil coupling the inner shroud and the outer shroud. The second rotating component is upstream of the one or more connecting airfoils of the first rotating component along the longitudinal direction. The second rotating component includes a plurality of second airfoils extended outward in the radial direction. The first rotating component defines at least one stage of the plurality of outer shroud airfoils upstream of the second rotating component.

In one embodiment, the first rotating component defines a lean angle relative to the axial centerline in which the plurality of outer shroud airfoils and/or the one or more connecting airfoils each define an obtuse lean angle approximately perpendicular to the axial centerline or extending toward the upstream end along the longitudinal direction from inward to outward along the radial direction.

In another embodiment, the first rotating component defines a lean angle relative to the axial centerline, and wherein the plurality of outer shroud airfoils and/or the one or more connecting airfoils each define an acute lean angle extending toward the downstream end along the longitudinal direction from inward to outward along the radial direction.

In yet another embodiment, the first rotating component and the second rotating component are in interdigitation along the longitudinal direction.

In various embodiments, the second rotating component defines a high speed turbine and the first rotating component defines a low speed turbine.

In one embodiment, the gas turbine engine defines, in serial flow arrangement along the longitudinal direction from the upstream end to the downstream end, the plurality of outer shroud airfoils of the first rotating component, the plurality of second airfoils of the second rotating component, and the one or more connecting airfoils of the first rotating component.

In still various embodiments, the inner shroud of the first rotating component defines a plurality of inner shroud airfoils extended outward along the radial direction. In one embodiment, the inner shroud extends from the connecting airfoil toward the downstream end.

In various embodiments, the gas turbine engine further includes a combustion section arranged in serial flow arrangement with the turbine section. The combustion section, the first stage of the first rotating component, and the second rotating component are in serial flow arrangement along the longitudinal direction from the upstream end to the downstream end. In one embodiment, the gas turbine engine defines, in serial flow arrangement along the longitudinal direction from the upstream end to the downstream end, the combustion section, the first stage of the first rotating component, the second rotating component, and then the first rotating component. In yet another embodiment, the gas turbine engine further includes a compressor section comprising a high pressure compressor and a fan assembly defining one or more stages of a plurality of blades. The fan assembly, the compressor section, the combustion section, and the turbine section are in serial flow arrangement along the longitudinal direction from the upstream end to the downstream end. The first rotating component is connected and rotatable with the fan assembly by a first shaft and the second rotating component is connected and rotatable with the high pressure compressor by a second shaft.

In still various embodiments, the plurality of outer shroud airfoils at the first stage are coupled to an axially extended hub disposed inward along the radial direction of the plurality of outer shroud airfoils. In one embodiment, the plurality of outer shroud airfoils at the first stage is further coupled to an arm extended generally inward along the radial direction, and wherein the arm is coupled to the axially extended hub, and wherein the axially extended hub extends generally in the longitudinal direction toward the upstream end of the engine. In another embodiment, the gas turbine engine further includes a first turbine bearing in which the second rotating component is further coupled to a second shaft extended toward the upstream end, and the first turbine bearing is disposed along the radial direction between the second shaft and the axially extended hub of the first rotating component. In yet various embodiments, the first turbine bearing defines an air bearing, a foil bearing, a roller bearing, or a ball bearing.

In still various embodiments, the inner shroud of the first rotating component defines an inner shroud diameter and the outer shroud of the first rotating component defines an outer shroud diameter, and wherein the inner shroud diameter is approximately 115% or less of the outer shroud diameter. In one embodiment, the inner shroud diameter is approximately equal to the outer shroud diameter.

In various embodiments, the first rotating component defines between about 3 and 10 stages inclusively. In one embodiment, the first rotating component defines at least two stages of the plurality of outer shroud airfoils upstream of the connecting airfoil.

In another embodiment, the first rotating component rotates in a first direction and the second rotating component rotates in a second direction opposite of the first direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
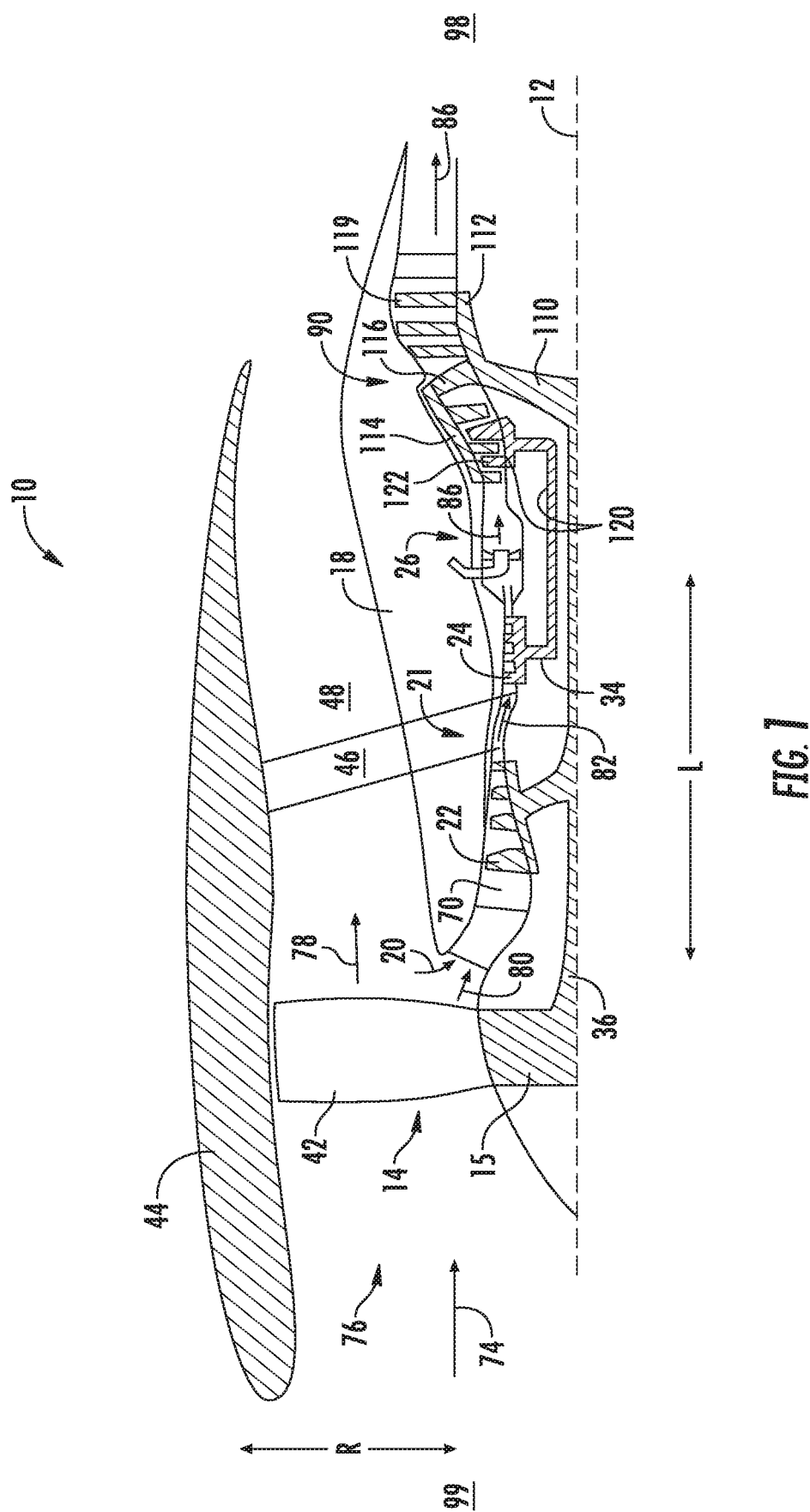
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low", "intermediate", "high", or their respective comparative degrees (e.g. -er, where applicable) each refer to relative speeds within an engine unless otherwise specified. For example, a "low turbine" or "low speed turbine" defines a rotational speed lower than a "high turbine" or "high speed turbine". Alternatively, unless otherwise specified, the aforementioned terms may be understood in their superlative degree. For example, a "low turbine" may refer to the lowest rotational speed turbine within a turbine section, and a "high turbine" may refer to the highest rotational speed turbine within the turbine section.

Embodiments of a gas turbine engine with an interdigitated turbine section are generally provided. The interdigitated turbine section includes a first rotating component extended in a longitudinal direction, in which the first rotating component includes an inner shroud, an outer shroud, and at least one connecting airfoil coupling the inner shroud to the outer shroud. The outer shroud includes a plurality of airfoils extended inward along a radial direction. The interdigitated turbine section may include a second rotating component. The second rotating component may include a plurality of second airfoils extended outward in the radial direction, in which the second rotating component is disposed between the plurality of airfoils of the first rotating component, and in which at least one stage of the plurality of outer shroud airfoils is forward or upstream of the second rotating component.

The embodiments of the gas turbine engine with interdigitated turbine section shown and described herein may enable additional stages of interdigitation of the first rotating component and the second rotating component, up to and including one or more stages of the first rotating component forward or upstream of the second rotating component. In various embodiments, the gas turbine engine with interdigitated turbine section may further reduce cooling air consumption, increase engine efficiency, performance, and/or operability, and/or reduce part quantities, weight, and/or packaging (i.e. axial and/or radial dimensions). Still further, the interdigitated turbine section may reduce a product of axial flow area and the square of the rotational speed (the product referred to as "$AN^2$") relative to an engine incorporating a reduction gearbox, while additionally reducing an average work factor per stage of the turbine section.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). Generally, the engine 10 defines, in serial flow arrangement from the upstream end 99 to the downstream end 98, the fan assembly 14, the compressor section 21, the combustion section 26, and the turbine section 90. In the embodiment shown in FIG. 1, the compressor section 21 defines a high pressure compressor (HPC) 24. In other embodiments, the fan assembly 14 may further include or define one or more stages of a plurality of fan blades 42 that are coupled to and extend outwardly in the radial direction R from a fan rotor 15 and/or a first shaft 36. In various embodiments, multiple stages of the plurality of fan blades 42 coupled to the first shaft 36 may be referred to as a low pressure compressor (LPC) 22.

An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

Figure 2:
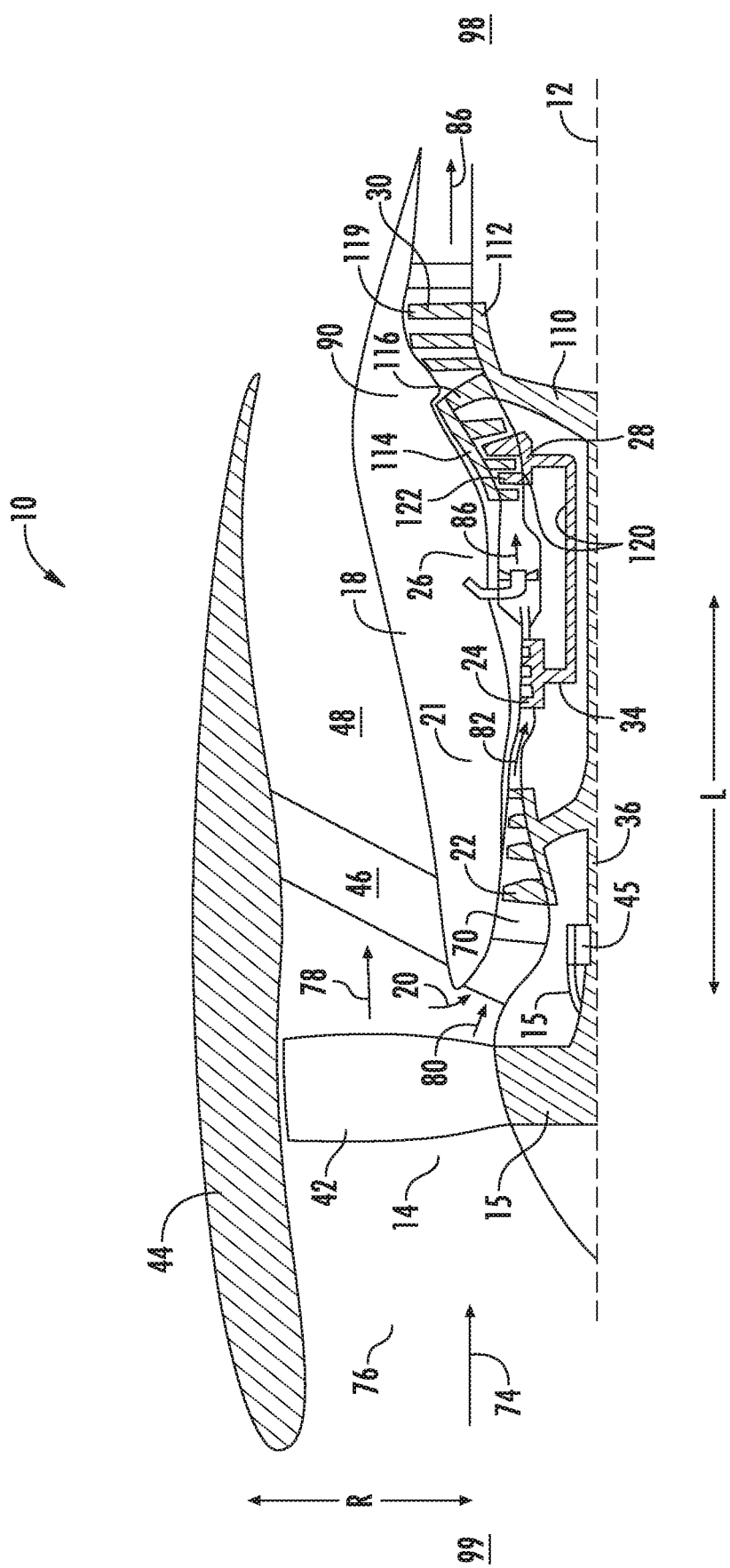
FIG. 2 is the schematic cross sectional view of the exemplary gas turbine engine of FIG. 1, further including a reduction gearbox in the fan assembly.

Referring now to FIG. 2, a schematic cross sectional side view of the engine 10 shown in FIG. 1 further including a reduction gearbox 45 in the fan assembly 14 is generally provided. The reduction gearbox 45 may include an epicyclical gear train including a star gear and a plurality of planet gears. The plurality of planet gears may each be fixed such that each planet gear rotates on a fixed axis relative to the star gear. An annular gear surrounds the plurality of planet gears and rotates and transfers power and torque from the star gear through the plurality of planet gears. In various embodiments, the gearbox may further include additional planet gears disposed radially between the plurality of planet gears and the star gear, or between the plurality of planet gears and the annular gear.

Figure 3:
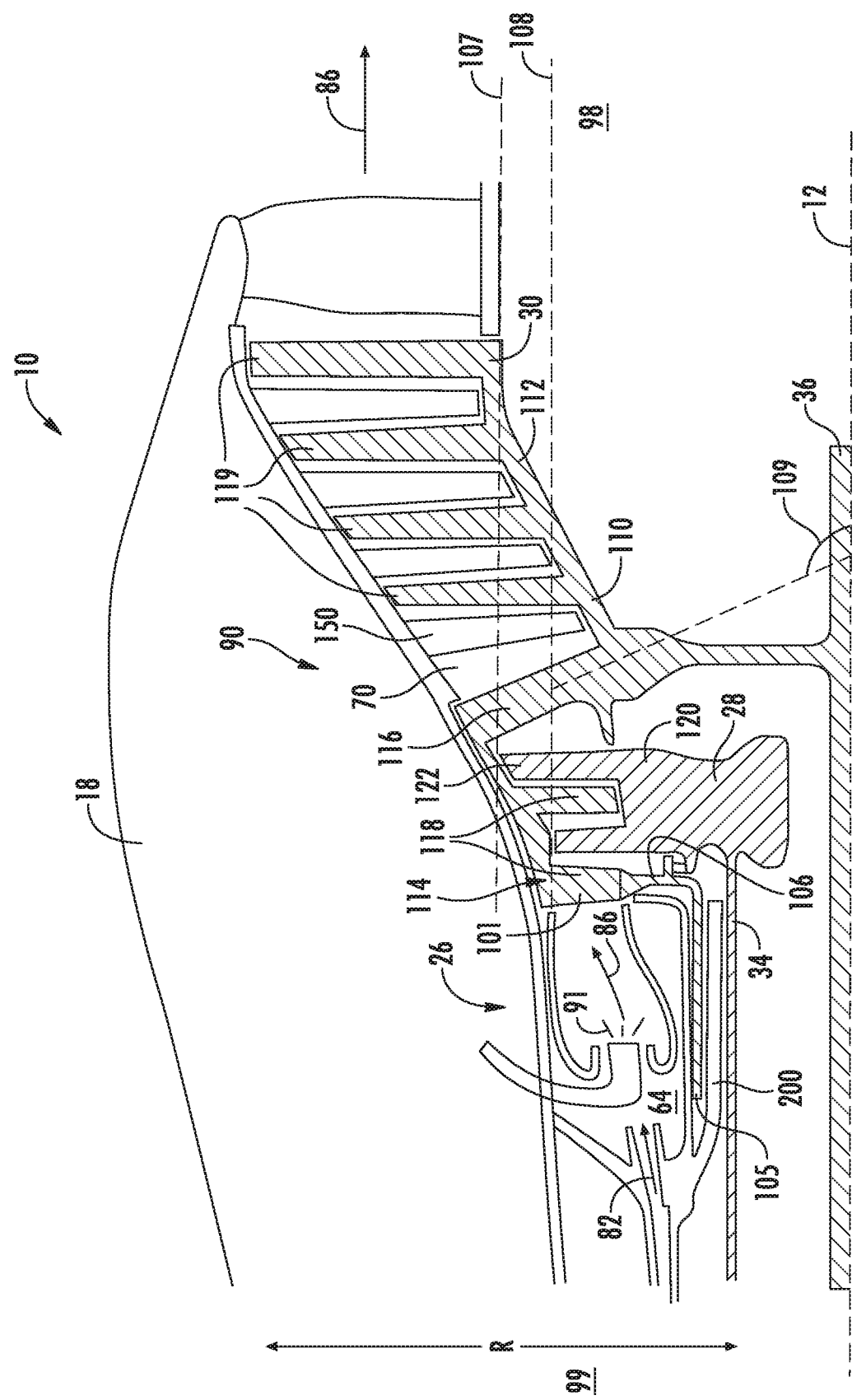
FIG. 3 is a schematic cross sectional view of an embodiment of the turbine section shown in FIG. 1.
Figure 4:
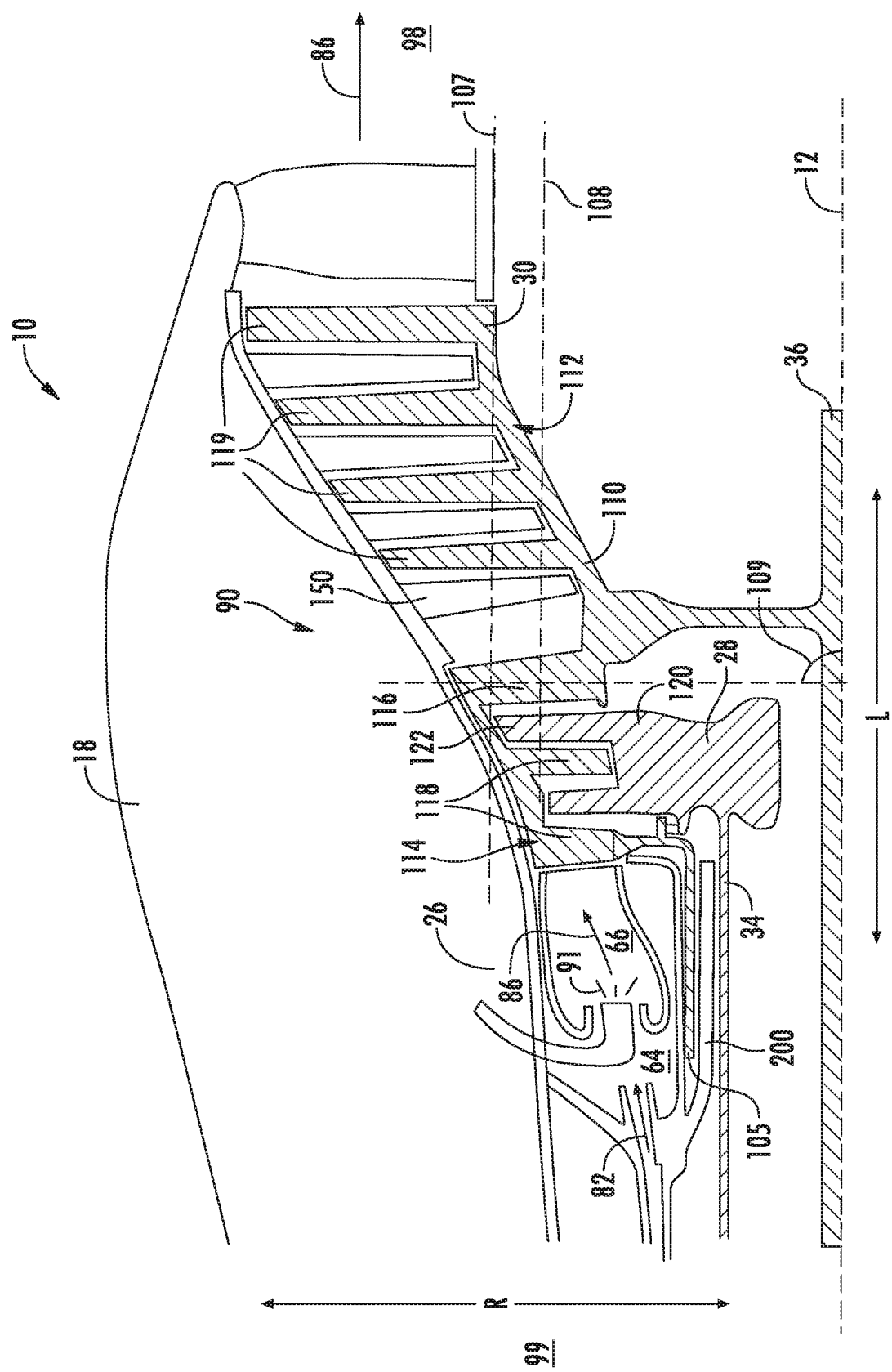
FIG. 4 is a schematic cross sectional view of another embodiment of the turbine section shown in FIG. 1.

Referring now to FIGS. 3-4, an exemplary embodiment of the turbine section 90 of the engine 10 is generally provided. The turbine section 90 includes a first rotating component 110 extended along the longitudinal direction L. The first rotating component 110 includes an inner shroud 112, an outer shroud 114, and at least one connecting airfoil 116 coupling the inner shroud 112 to the outer shroud 114. The outer shroud 114 includes a plurality of outer shroud airfoils 118 extended inward along the radial direction R. In various embodiments, the inner shroud 112 may include a plurality of inner shroud airfoils 119 extended outward along the radial direction R.

The inner shroud 112 and the outer shroud 114 each extend generally along the longitudinal direction L. The inner shroud 112 and/or the outer shroud 114 may each extend at least partially in the radial direction R. In various embodiments, the inner shroud 112 extends from the connecting airfoil 116. In one embodiment, the inner shroud 112 further extends toward the downstream end 98 along the longitudinal direction L. In still various embodiments, the outer shroud 114 extends from the connecting airfoil 116 toward the upstream end 99 along the longitudinal direction L toward the combustion section 26.

Referring still to FIGS. 3-4, the turbine section 90 may further include a second rotating component 120 disposed forward or upstream 99 of the one or more connecting airfoils 116 of the first rotating component 110. The second rotating component 120 includes a plurality of second airfoils 122 extended outward along the radial direction R.

In various embodiments, the first rotating component 110 defines a plurality of stages of rotating airfoils, such as the plurality of outer shroud airfoils 118 disposed along the longitudinal direction L, or the one or more connecting airfoils 116, or the plurality of inner shroud airfoils 119 disposed along the longitudinal direction L. In one embodiment, the first rotating component 110 defines at least one stage forward or upstream 99 of the second rotating component 120. In another embodiment, the turbine section 90 defines a first stage of airfoils in which the first stage includes the plurality of outer shroud airfoils 118 of the first rotating component 110 forward or upstream 99 of each stage of the second rotating component 120.

In various embodiments, such as shown in FIGS. 3-4, the engine 10 defines, in serial flow arrangement along the longitudinal direction L from the upstream end 99 to the downstream end 98, the plurality of outer shroud airfoils 118 of the first rotating component 110, the plurality of second airfoils 122 of the second rotating component 120, and the one or more connecting airfoils 116 of the first rotating component 110. In still various embodiments, additional iterations of interdigitation between the first rotating component 110 and the second rotating component 120 may be defined forward or upstream 99 of the connecting airfoils 116.

Referring still to FIGS. 3-4, the engine 10 defines, in serial flow arrangement along the longitudinal direction L from the upstream end 99 to the downstream end 98, the combustion section 26 and the turbine section 90. More specifically, the engine 10 may define the serial flow arrangement of the combustion section 26, the first stage 101 of the first rotating component 110, and the second rotating component 120. In various embodiments, additional iterations of interdigitation between the first rotating component 110 and the second rotating component 120 may be defined aft or downstream 98 of the aforementioned arrangement.

For example, as shown in FIGS. 3-4, the engine 10 may further define the serial flow arrangement of the first rotating component 110, the second rotating component 120, and the first rotating component 110. As another non-limiting example, the engine 10 may further define the serial flow arrangement of the plurality of outer shroud airfoils 118, the plurality of second airfoils 122, the plurality of outer shroud airfoils 118, the plurality of second airfoils 122, and the connecting airfoils 116. It should be appreciated that although FIGS. 3-4 shows the second rotating component 120 as defining two stages, the second rotating component 120 may define generally one or more stages between the first stage 101 of the first rotating component 110 and the connecting airfoils 116 of the first rotating component 110, and interdigitated therebetween along the longitudinal direction L.

Referring now to FIGS. 1-4, in various embodiments, the first rotating component 110 defines a low speed turbine 30 drivingly connected and rotatable with a first shaft 36 defining low speed shaft. In one embodiment, as shown in FIG. 1, the first shaft 36 is connected to the fan assembly 14, of which is driven in rotation by the first rotating component 110 of the turbine section 90. The first shaft 36 is connected to the fan rotor 15 of the fan assembly 14. In another embodiment, as shown in FIG. 2, the first shaft 36 is connected to the reduction gearbox 45 from the downstream end 98 and the fan rotor 15 is connected to the reduction gearbox 45 from the upstream end 99. In various embodiments, as shown in FIGS. 1 and 2, the fan assembly 14 defines a plurality of stages of the plurality of fan blades 42, of which further define the LPC 22. The LPC 22 is connected to and rotatable with the first shaft 36 and the plurality of fan blades 42 is connected and rotatable with the fan rotor 15. In the embodiment shown in FIG. 2, the reduction gearbox 45 is disposed between the LPC 22 and the plurality of fan blades 42 such that LPC 22, rotatable with the first shaft 36, is rotating at a first speed and the fan rotor 15, to which the plurality of fan blades 42 is connected, is rotating at a proportionally reduced second speed relative to the first speed.

Referring still to FIGS. 1-4, the second rotating component 120 of the turbine section 90 defines a high speed turbine 28 drivingly connected and rotatable with a second shaft 34 defining a high speed shaft. The second shaft 34 is connected to the HPC 24, of which is driven in rotation by the second rotating component 120 of the turbine section 90. In various embodiments, the second rotating component 120 defining the high speed turbine 28 rotates generally at a higher rotational speed than the first rotating component 110 defining the low speed turbine 30.

During operation of the engine 10, as shown in FIGS. 1-5 collectively, a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel 91 is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

In various embodiments, the first rotating component 110, and the first shaft 36 to which it is attached, rotates in a first direction 161 (shown in FIG. 5) along the circumferential direction C. The second rotating component 120, and the second shaft 34 to which it is attached, rotates in a second direction 162 (shown in FIG. 5) opposite of the first direction 161 along the circumferential direction C. Although further described herein as a counter-rotating turbine engine, in which the first rotating component 110 rotates in a direction opposite of the second rotating component 120, it should be understood that the structures provided herein enable the engine 10 to be configured as a co-rotating engine, in which the first rotating component 110 and the second rotating component 120 each rotate in the first direction 161.

It should further be understood that the first direction 161 and the second direction 162 as used and described herein are intended to denote directions relative to one another. Therefore, the first direction 161 may refer to a clockwise rotation (viewed from downstream looking upstream) and the second direction 162 may refer to a counter-clockwise rotation (viewed from downstream looking upstream). Alternatively, the first direction 161 may refer to a counter-clockwise rotation (viewed from downstream looking upstream) and the second direction 162 may refer to a clockwise rotation (viewed from downstream looking upstream).

Still further during an operation of the engine 10, combustion gases 86 exiting the combustion section 26 define a generally low speed toward the downstream end 98 of the engine 10. A low speed rotation (e.g. along a tangential or circumferential direction C, as shown in FIG. 5) of the first stage 101 of the first rotating component 110 accelerates a speed of the combustion gases 86, such as in the tangential or circumferential direction C (shown in FIG. 5), to approximately equal or greater than a speed of the second rotating component 120.

By defining the first rotating component 110 as the first stage 101 of the turbine section 90 aft or downstream of the combustion section 26, the engine 10 may obviate the need for a first turbine vane or nozzle guide vane to accelerate the combustion gases 86 forward or upstream of the second rotating component 120 defining a high speed turbine. As such, the engine 10 may reduce a quantity or mass of cooling air from the compressor section 21 and/or combustion section 26, thereby increasing engine efficiency by enabling more energy (i.e. compressed air) to be used during combustion. Additionally, or alternatively, the turbine section 90 may reduce necessary cooling air and enable increased performance and/or operability of the compressor section 21, including surge margin and/or efficiency, or decrease a required amount of work from the compressor section 21, which may reduce axial dimensions or stages of the compressor section 21 and further reduce engine packaging, weight, and/or part count, and generally improve engine 10 performance.

Additionally, obviating the need for the first turbine vane or nozzle guide vane may enable the turbine section 90, or more specifically, the first stage 101, as a rotating stage, to be designed to an average combustion gas 86 temperature rather than designed to accommodate peak temperatures (i.e. high spots) along an annulus of the core flowpath 70 within the combustion section 26. Therefore, as all of the plurality of outer shroud airfoils 118 of the first stage 101 are rotating, all of the plurality of outer shroud airfoils 118 may only transiently endure adverse effects of combustion hot spots rather than substantially sustained or constant exposure to a higher temperature from the combustion gases in contrast to other locations about the annulus of the core flowpath 70. Still further, the turbine section 90 described herein may enable alternative design methods for the combustion section 26 due to a decreased adverse effect of combustion hot spots on the turbine section 90. Therefore, the turbine section 90 may enable design of the combustion section 26 to further improve combustion stability, decrease emissions, increase operability across all or part of a flight envelope, increase altitude re-light performance, and/or decrease lean blowout (LBO).

Figure 5:
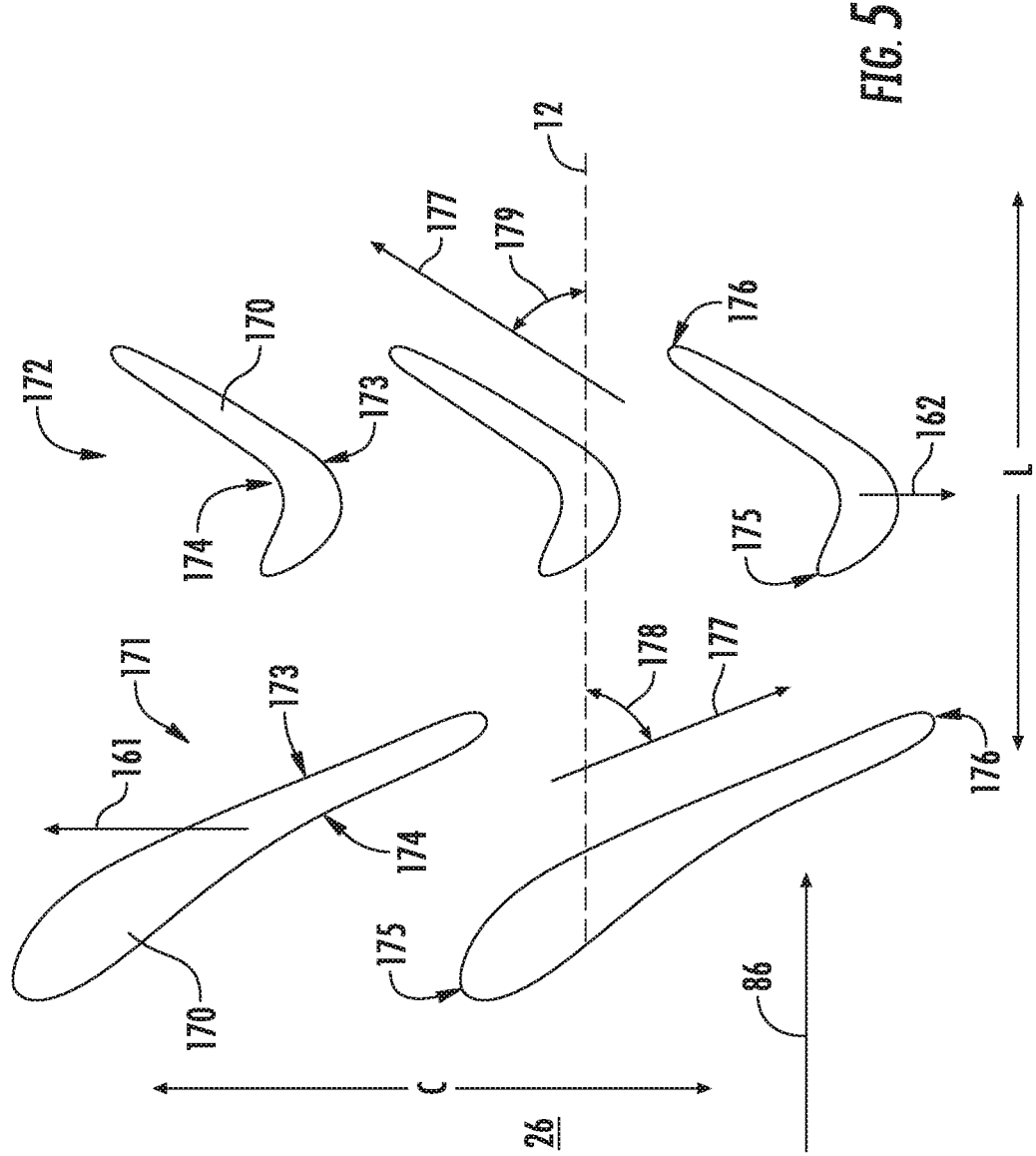
FIG. 5 is cross sectional view depicting exemplary blade pitch angles.

Referring now to FIG. 5, exemplary embodiments of orientations of airfoils 170 of the first and second rotating components 110, 120 are generally provided. FIG. 5 generally depicts angular orientations and profiles of various embodiments of the airfoils 170, in which the airfoils 170 may be representative of the plurality of outer shroud airfoils 118, the plurality of second airfoils 122, the one or more connecting airfoil(s) 116, or the plurality of inner shroud airfoils 119. The airfoils 170 depicted in FIG. 5 generally describe, at least in part, aerodynamic structures inducing the first direction 161 of rotation along the circumferential direction C or the second rotation 162 opposite of the first direction 161 for the first and/or second rotating components 110, 120.

The airfoils 170 may be arranged along the circumferential direction C into a plurality of stages 171, 172 separated along the longitudinal direction L. The first direction stage 171 shown in FIG. 5 may correspond to the first stage 101 of the first rotating component 110 shown in FIGS. 3-4. Still further, orientations and/or profiles of the airfoils 170 of the first direction stage 171 may correspond generally to the airfoils of the first rotating component 110, such as the plurality of outer shroud airfoils 118, the connecting airfoils 116, and the plurality of inner shroud airfoils 119. The airfoils 170 shown in the second direction stage 172 shown in FIG. 5 may correspond to the plurality of second airfoils 122 of the second rotating component 120 shown in FIGS. 3-4.

In various embodiments, the airfoil 170 may define a first exit angle 178 defined by an angular relationship of the axial centerline 12 to an exit direction 177 of the combustion gases 86 passing the airfoil 170 along the longitudinal direction L from the upstream end 99 toward the downstream end 98. The resulting first exit angle 178 may define the airfoil 170 such that the flow of combustion gases 86 across each airfoil 170 from the upstream end 99 toward the downstream end 98 induces the first direction 161 of rotation in the circumferential direction C.

In other embodiments, the airfoil 170 may define a second exit angle 179 defined by an angular relationship to the axial centerline 12 to the exit direction 177 of the combustion gases 86, in which the exit direction 177 extends generally opposite for the second exit angle 179 relative to the first exit angle 178. The resulting second exit angle 179 may define the airfoil 170 such that the flow of combustion gases 86 across each airfoil 170 induces the second direction 162 of rotation in the circumferential direction C.

It should be appreciated that the first exit angle 178 and the second exit angle 179 each define general angular relationships relative the axial centerline 12, such as a positive or negative acute angle. Therefore, each airfoil 170 defining the first exit angle 178 (or, alternatively, the second exit angle 179) may define different magnitudes of angles at each stage of airfoils, in which each angle defines a generally positive acute angle relative to the axial centerline 12 (or, alternatively, a generally negative acute angle for the second exit angle 179).

Referring still to FIG. 5, the airfoil 170 may define a suction side 173 and a pressure side 174. The first direction stage 171 may define the suction side 173 as convex toward the first direction 161 and the pressure side 174 as concave toward the first direction 161 such that the airfoils 170 rotate in the first direction 161. The second direction stage 172 may define the suction side 173 as convex toward the second direction 162 opposite of the first direction 161 and the pressure side 174 as concave toward the second direction 162 such that the airfoils 170 rotate in the second direction 162.

Referring to FIGS. 1-5, in one embodiment, the airfoils 170 of the first rotating component 110 are generally configured as defined in the first direction stage 171 to rotate in the first direction 161. The airfoils 170 of the second rotating component 120 are generally configured as the second direction stage 172 to rotate in the second direction 162 opposite of the first direction 161. For example, the first rotating component 110, as the low speed turbine 30 coupled to the first shaft 36, may rotate clockwise viewed from the downstream end 98 looking toward the upstream end 99. The second rotating component 120, as the high speed turbine 28 coupled to the second shaft 34, may rotate counter-clockwise when viewed from the downstream end 98 toward the upstream end 99.

Each stage of the first rotating component 110 and the second rotating component 120 defines a plurality of rotating airfoils 170 (e.g. blades, shown in FIG. 5). Although FIGS. 3-4 depicts the turbine section 90 as defining two stages forward of the connecting airfoils 116 of the first rotating component 110 interdigitated with the second rotating component 120 defining two stages, it should be understood that the turbine section 90 may include other quantities or combinations of interdigitation. For example, the first and second rotating components 110, 120 may together define additional iterations of stages disposed upstream 99 or forward of the connecting airfoil(s) 116. As another non-limiting example, the second rotating component 120 may define a single stage interdigitated among stages of the first rotating component 110.

In various embodiments of the engine 10 including the turbine section 90 shown in FIGS. 1-5, the first rotating component 110 defines between about 3 and 10 stages (inclusively) i.e. between about 3 and 10 rows of pluralities of rotating airfoils separated along the longitudinal direction L. In one embodiment, the first rotating component 110 defines at least one stage upstream or forward of the second rotating component 120 (e.g. the first stage 101). In another embodiment, the first rotating component 110 defines at least two stages of the plurality of outer shroud airfoils 118 upstream of the connecting airfoil 116. In yet another embodiment, the first rotating component 110 defines at least two stages downstream or aft of the second rotating component 120 (e.g. the connecting airfoil 116, the plurality of outer shroud airfoils 118, and/or the plurality of inner shroud airfoils 119, or combinations thereof).

Referring back to FIGS. 3-4, exemplary embodiments of the engine 10 are generally provided, in which one or more stages of the plurality of outer shroud airfoils 118 and/or the connecting airfoils 116 define a lean angle 109 relative to the axial centerline 12 and the radial direction R. As discussed herein, the lean angle 109 is defined counterclockwise from the axial centerline 12 from the downstream end 98 toward the upstream end 99.

In the embodiment shown in FIG. 3, the connecting airfoils 116 and/or the outer shroud airfoils 118 may each define an obtuse or forward lean angle 109 in which one or more of the connecting airfoils 116 and/or the outer shroud airfoils 118 extend toward the downstream end 98 (i.e. radially inward ends of the airfoils 116, 118 are further downstream than radially outward ends). The obtuse or forward lean angle 109 may counteract or offset centrifugal loads on the plurality of outer shroud airfoils 118 and/or connecting airfoils 116 during rotation of the turbine section 90. The obtuse lean angle 109 may also, or alternatively, counteract or offset axial loads on each of the airfoils 116, 118 during operation of the engine 10, such as due to rotation and/or the flow of combustion gases 86 through a core flowpath 70. Still further, the obtuse or forward lean angle 109 may dispose the airfoils 116, 118 generally perpendicular to the core flowpath 70 downstream of each airfoil 116, 118.

However, in the embodiment shown in FIG. 4, the connecting airfoils 116 and/or the outer shroud airfoils 118 may each define a generally perpendicular or acute lean angle 109 in which one or more of the connecting airfoils 116 and/or the outer shroud airfoils 118 extend generally radially outward from the axial centerline 12 or toward the upstream end 99 (i.e. radially inward ends of the airfoils 116, 118 are approximately equal to or further upstream than radially outward ends).

Referring still to FIGS. 3-4, the inner shroud 112 may define a maximum inner shroud diameter 107 and the outer shroud 114 may define an outer shroud diameter 108. In one embodiment, the inner shroud diameter 107 may be approximately equal to the outer shroud diameter 108. For example, the inner shroud diameter 107 defined at a last stage of the first rotating component 110 may be approximately equal to the outer shroud diameter 108 at approximately the first stage 101. In other embodiments, the inner shroud diameter 107 may be approximately 115% or less of the outer shroud diameter 108. In yet another embodiment, the inner shroud diameter 107 at the last stage of the first rotating component 110 may be approximately 115% or less of the outer shroud diameter 108 at the first stage 101 of the first rotating component 110. In still other embodiments, the inner shroud diameter 107 may be approximately 110% or less of the outer shroud diameter 108. In yet other embodiments, the inner shroud diameter 107 may be approximately 105% or less of the outer shroud diameter 108.

The exemplary embodiment of the engine 10 shown in FIGS. 3-4 may further include a first turbine bearing 200 disposed radially within at least the combustion section 26 and/or the turbine section 90. In various embodiments, the first turbine bearing 200 may define a generally non-contacting air bearing or foil bearing. In various other embodiments, the first turbine bearing 200 may define a generally contacting bearing such as, but not limited to, a roller bearing or a ball bearing. The first turbine bearing 200 may further enable the overhung or cantilevered first rotating component 110 to extend forward or upstream of the second rotating component 120.

In various embodiments, the second rotating component 120 is coupled to the second shaft 34 extended toward the upstream end 99 of the engine 10. The plurality of outer shroud airfoils 118 at the first stage 101 may further be coupled to an axially extended hub 105 disposed inward along the radial direction R of the plurality of outer shroud airfoils 118 at the first stage 101. In one embodiment, the plurality of outer shroud airfoils 118 at the first stage 101 is further coupled to an arm 106 extended generally inward along the radial direction R. The arm 106 is coupled to the axially extended hub 105 in which the axially extended hub 105 extends generally in the longitudinal direction L toward the upstream end 99. The first turbine bearing 200 is disposed between the second shaft 34 and the axially extended hub 105 of the first rotating component 110 along the radial direction R.

In one embodiment, the first turbine bearing 200 supports the first rotating component 110 inward of the plurality of outer shroud airfoils 118 at the first stage 101. For example, the first turbine bearing 200 may support the overhung or cantilevered first rotating component 110 generally forward or upstream 99 of the second rotating component 120.

In another embodiment, the first turbine bearing 200 supports the second rotating component 120. In various embodiments, the first turbine bearing 200 supports the first rotating component 110 and the second rotating component 120. For example, the first turbine bearing 200 may define a differential bearing disposed between the first rotating component 110 and the second rotating component 120 along the radial direction R. In still various embodiments, the first turbine bearing 200 may define an air bearing, a foil bearing, a roller bearing, or a ball bearing.

During operation of the engine 10, a flow of a lube, hydraulic, or pneumatic fluid (e.g. oil, air, etc.) may flow from the compressor section 21 and/or through the combustion section 26 (e.g. along the radial direction R through one or more manifolds) to the first turbine bearing 200 to provide a protective film that may enable rotation and protect the first rotating component 110, the second rotating component 120, and the first turbine bearing 200 from damage due to friction, temperature, and other wear and degradation.

The arrangement of the first bearing 200 may provide support toward the upstream end 99 of the first rotating component 110 to be interdigitated forward and/or among the second rotating component 120. Furthermore, the first bearing 200 provides support toward the upstream end 99 of the first rotating component 110 that limits an overhanging or cantilevered weight of the first rotating component 110 from the connecting airfoil 116 upstream toward the combustion section 26. Still further, the first bearing 200 provides support toward the upstream end 99 of the first rotating component 110 that provides balance to the inner shroud 112 and the plurality of inner shroud airfoils 119 extended therefrom toward the downstream end 98 of the turbine section 90. In various embodiments, the axially extended hub 105 of the first rotating component 110 may further define one or more balance planes. The balance plane may define features to which weight may be added to or removed from the first rotating component 110 to aid rotor balance and operation.

Referring still to FIGS. 2-3, the turbine section 90 further includes one or more turbine vanes 150. The turbine vane 150 may define a plurality of stationary airfoils (i.e. vanes) in circumferential arrangement. In one embodiment, the turbine vane 150 is disposed between the pluralities of inner shroud airfoils 119 along the longitudinal direction L. In various embodiments, the turbine vane 150 is disposed downstream 98 of the connecting airfoil 116 of the first rotating component 110. The turbine vane 105, or pluralities thereof, interdigitated among the pluralities of inner shroud airfoils 119 may enable further conditioning of the combustion gases 86 and work or energy extraction from the first rotating component 110 via the plurality of inner shroud airfoils 119.

The turbine section 90 shown and described herein may improve upon existing turbine sections by providing improved fuel efficiency, operational efficiency, and/or power output while maintaining or reducing weight, part count, and/or packaging. The plurality of outer shroud airfoils 118 of the first rotating component 110 interdigitated among the plurality of second airfoils 122 of the second rotating component 120 may reduce packaging and reduce part count by removing stages of stationary airfoils between each rotating component. Additionally, the turbine section 90 may provide efficiency benefits comparable to a reduction gearbox without adding weight or size (e.g. axial length) to the engine 10. The first rotating component 110, as the first stage 101 downstream of the combustion section 26, may further improve engine efficiency by reducing cooling air appropriated away from producing combustion gases 86, thereby allowing more energy from the compressor section 21 to be used in combustion and operation of the engine 10. Furthermore, removing the nozzle guide vane between the combustion section 26 and the first rotating component 110 of the turbine section 90 may reduce or eliminate design constraints related to hot spots in the combustion gases along the annulus of the core flowpath 70.

The various embodiments of the turbine section 90 generally shown and described herein may be constructed as individual blades installed into drums or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. The turbine section 90, or portions or combinations of portions thereof, including the inner shroud 112, the outer shroud 114, the connecting airfoil(s) 116, the plurality of outer shroud airfoils 118, and/or the plurality of inner shroud airfoils 119, may be formed using additive manufacturing or 3D printing, or casting, forging, machining, or castings formed of 3D printed molds, or combinations thereof. The turbine section 90, or portions thereof, such as stages of the rotating components 110, 120, the outer shroud 114, the inner shroud 112, and/or various shrouds, seals, and other details may be mechanically joined using fasteners, such as nuts, bolts, screws, pins, or rivets, or using joining methods, such as welding, brazing, bonding, friction or diffusion bonding, etc., or combinations of fasteners and/or joining methods. Still further, it should be understood that the first rotating component 110, including the inner and/or outer shroud 112, 114, may incorporate features that allow for differential expansion. Such features include, but are not limited to, aforementioned methods of manufacture, various shrouds, seals, materials, and/or combinations thereof.

The systems shown in FIGS. 1-5 and described herein may decrease fuel consumption, increase operability, increase engine performance and/or power output while maintaining or reducing weight, part count, and/or packaging (e.g. radial and/or axial dimensions). The systems provided herein may allow for increased bypass ratios and/or overall pressure ratios over existing gas turbine engine configurations, such as turbofans, while maintaining or reducing packaging relative to other gas turbine engines of similar power output. The systems described herein may contribute to improved bypass ratio and/or overall pressure ratio and thereby increase overall gas turbine engine efficiency. The systems provided herein may increase overall gas turbine engine efficiency by reducing or eliminating stationary airfoils that require cooling air (e.g. nozzle guide vane). Additionally, the systems provided herein may reduce gas turbine engine packaging and weight, thus increasing efficiency, by reducing rotating and/or stationary airfoil quantities (e.g. blades and/or vanes) by approximately 40% or more over gas turbine engines of similar size and/or power output.

Still further, the systems shown in FIGS. 1-5 and described herein may reduce a product of a flow area and the square of the rotational speed (the product herein referred to as "$AN^2$") of the gas turbine engine. For example, engine 10 shown and described in regard to FIGS. 1-5 may generally reduce $AN^2$ relative to a conventional geared turbofan configuration. Generally, lowering the $AN^2$, such as by reducing the rotational speed and/or the flow area, increases the required average stage work factor (i.e. the average required loading on each stage of rotating airfoils). However, the systems described herein may lower the $AN^2$ while also lowering the average stage work factor and maintaining axial length of the turbine section 90 (compared to engines of similar thrust output and packaging) by interdigitating the first rotating component 110 among the one or more stages of the second rotating component 120 while also defining a non-digitated turbine structure (i.e. the inner shroud 112 and the plurality of inner shroud airfoils 119) toward the downstream end 98 of the turbine section 90. Therefore, the first rotating component 110 may increase the quantity of rotating stages of airfoils while reducing the average stage work factor, and therefore the $AN^2$, while mitigating increases in axial length to produce a similar $AN^2$ value. The first rotating component 110 may further reduce the $AN^2$ while additionally reducing the overall quantity of airfoils, rotating and stationary, in the turbine section 90 relative to turbine sections of gas turbine engines of similar power output and/or packaging.

Furthermore, the systems shown in FIGS. 1-5 and described herein may further improve engine efficiency, reduce airfoil quantity, reduce engine weight, and/or alleviate combustion section design constraints by interdigitating the first rotating component 110 forward or upstream 99 of the second rotating component 120 defining the high speed turbine 28. For example, defining the first stage of the first rotating component 110 as immediately downstream 98 of the combustion section 26, without a first turbine vane or nozzle guide vane therebetween, as well as defining the first rotating component 110 in counter-rotation with the second rotating component 120, may reduce effects of overall combustion hot spots on the first stage of the first rotating component 110 in contrast to a stationary, first turbine vane or nozzle guide vane. As such, the turbine section 90 and engine 10 described herein may remove constraints to combustion section 26 design by de-emphasizing hot spots, or combustion pattern factor, in favor of other design criteria, such as decreasing emissions, improving lean blow-out (LBO) and/or altitude re-light, improving overall operability across part or all of an operating envelope, or increasing the operating envelope.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, wherein the gas turbine engine defines a longitudinal direction, a radial direction, and a circumferential direction, and an axial centerline, and wherein the gas turbine engine defines an upstream end and a downstream end along the longitudinal direction, the gas turbine engine comprising:
   a combustion section;
   a turbine section comprising a first rotating component and a second rotating component, wherein the first rotating component defines a lower speed spool than the second rotating component, wherein the first rotating component includes an inner shroud and an outer shroud outward of the inner shroud in the radial direction, wherein the outer shroud defines a plurality of outer shroud airfoils extended inward of the outer shroud along the radial direction, and wherein the first rotating component further includes at least one connecting airfoil coupling the inner shroud and the outer shroud, and wherein the second rotating component is upstream of the one or more connecting airfoils of the first rotating component along the longitudinal direction, the second rotating component includes a plurality of second airfoils extended outward in the radial direction, and wherein the first rotating component defines at least one stage of the plurality of outer shroud airfoils upstream of the second rotating component, the first rotating component comprising a first stage airfoil immediately downstream of the combustion section.

2. The gas turbine engine of claim 1, wherein the first rotating component defines a lean angle relative to the axial centerline, and wherein the plurality of outer shroud airfoils, the one or more connecting airfoils, or both, defines an obtuse lean angle, wherein the plurality of outer shroud airfoils, the one or more connecting airfoils, or both, extend from inward to outward along the radial direction toward the upstream end along the longitudinal direction.

3. The gas turbine engine of claim 1, wherein the first rotating component defines a lean angle relative to the axial centerline, and wherein the plurality of outer shroud airfoils, the one or more connecting airfoils, or both, defines an acute lean angle, wherein the plurality of outer shroud airfoils, the one or more connecting airfoils, or both extend from inward to outward along the radial direction toward the downstream end along the longitudinal direction.

4. The gas turbine engine of claim 1, wherein the first rotating component and the second rotating component are in interdigitation along the longitudinal direction.

5. The gas turbine engine of claim 1, wherein the second rotating component defines a high speed turbine and the first rotating component defines a low speed turbine.

6. The gas turbine engine of claim 1, wherein the gas turbine engine defines, in serial flow arrangement along the longitudinal direction from the upstream end to the downstream end, the plurality of outer shroud airfoils of the first rotating component, the plurality of second airfoils of the second rotating component, and the one or more connecting airfoils of the first rotating component.

7. The gas turbine engine of claim 1, wherein the inner shroud of the first rotating component defines a plurality of inner shroud airfoils extended outward along the radial direction.

8. The gas turbine engine of claim 7, wherein the inner shroud extends from the connecting airfoil toward the downstream end.

9. The gas turbine engine of claim 1, wherein the combustion section, the first stage of the first rotating component, and the second rotating component are in serial flow arrangement along the longitudinal direction from the upstream end to the downstream end.

10. The gas turbine engine of claim 9, wherein the gas turbine engine defines, in serial flow arrangement along the longitudinal direction from the upstream end to the downstream end, the combustion section, the first stage of the first rotating component, the second rotating component, and another stage of the first rotating component.

11. The gas turbine engine of claim 1, wherein the plurality of outer shroud airfoils at the first stage are coupled to an axially extended hub disposed inward along the radial direction of the plurality of outer shroud airfoils.

12. The gas turbine engine of claim 11, wherein the plurality of outer shroud airfoils at the first stage is further coupled to an arm extended generally inward along the radial direction, and wherein the arm is coupled to the axially extended hub, and wherein the axially extended hub extends generally in the longitudinal direction toward the upstream end of the engine.

13. The gas turbine engine of claim 11, further comprising a first turbine bearing, and wherein the second rotating component is further coupled to a second shaft extended toward the upstream end, and wherein the first turbine bearing is disposed along the radial direction between the second shaft and the axially extended hub of the first rotating component.

14. The gas turbine engine of claim 13, wherein the first turbine bearing defines an air bearing, a foil bearing, a roller bearing, or a ball bearing.

15. The gas turbine engine of claim 1, wherein the inner shroud of the first rotating component defines an inner shroud diameter and the outer shroud of the first rotating component defines an outer shroud diameter, and wherein the inner shroud diameter is approximately 115% or less of the outer shroud diameter.

16. The gas turbine engine of claim 15, wherein the inner shroud diameter is approximately equal to the outer shroud diameter.

17. The gas turbine engine of claim 1, wherein the first rotating component comprises between 3 and 10 stages inclusively.

18. The gas turbine engine of claim 17, wherein the first rotating component comprises at least two stages of the plurality of outer shroud airfoils upstream of the connecting airfoil.

19. The gas turbine engine of claim 1, wherein the first rotating component rotates in a first direction and the second rotating component rotates in a second direction opposite of the first direction.

20. The gas turbine engine of claim 9, further comprising:
- a compressor section comprising a high pressure compressor; and
- a fan assembly comprising one or more stages of a plurality of blades, wherein the fan assembly, the compressor section, the combustion section, and the turbine section are in serial flow arrangement, and wherein the first rotating component is connected and rotatable with the fan assembly by a first shaft, and wherein the second rotating component is connected and rotatable with the high pressure compressor by a second shaft.

* * * * *